United States Patent Office 2,762,841
Patented Sept. 11, 1956

2,762,841
PROCESS OF PRODUCING L-GLUTAMINE

Bruno Vassel, Deerfield, Ill., assignor to International Minerals & Chemical Corporation, New York, N. Y., a corporation of New York No Drawing. Application August 6, 1954, Serial No. 448,367

9 Claims. (Cl. 260—534)

This invention relates to the preparation of glutamic acid derivatives, and more particularly to a process for preparing L-glutamine.

In the past, L-glutamine has been synthesized by only two processes both of which are a complicated series of steps. Because of the nature of the reactions involved and because of the plurality of steps, yields have been very low. Generally between about a 5% and about a 15% yield is obtained using the best known synthesis, that is, the carbobenzyloxy method of Bergmann, Zervas, and Salzmann, Berichte 66B, 1288–90 (1933), and the method of Kidd and King, Nature, 162, 776 (1948). In addition to these disadvantages in the Bergmann method there was the hazard involved in working with benzyl chloroformate, which is a reactant in one of the steps of these processes. Upon standing and/or drying, this compound spontaneously decomposes in an explosive manner and in the past has caused serious injury to workers. Heretofore, there has been no commercially acceptable method for synthesizing glutamine. In the Kidd and King method, there are an even greater number of steps involved than in the Bergmann method, and the reagent employed, which is phthalic anhydride, tends to racemize the glutamic acid and the glutamine produced is not the pure optically active form found in nature.

It is an object of the instant invention to provide an improved method for the synthesis of glutamine having the same optical activity as the glutamine found in nature, that is, L-glutamine.

It is a further object of the instant invention to provide a method for synthesizing L-glutamine in comparatively high yields without resorting to the production and resolution of a racemic mixture.

It is a further object of the instant invention to provide an improved synthesis of L-glutamine in which comparatively high yields are obtained using readily available cheap reactants.

These and other objects of the instant invention will become more apparent upon a fuller understanding of the invention as hereinafter described.

In accordance with this invention, L-glutamine is produced by reacting a gamma-amide of an N-carboallyloxy-L-glutamic acid with a hydrogen halide such as hydrogen chloride or hydrogen bromide under anhydrous conditions. By the term "glutamine" as used herein is meant the optically active natural form of glutamine, that is, L-glutamine.

More particularly, this invention is carried out by amidating a gamma-ester of an N-carboallyloxy-L-glutamic acid to produce the corresponding gamma-amide of this L-glutamic acid derivative, and treating the gamma-amide of the N-carboallyloxy-L-glutamic acid with hydrogen bromide or hydrogen chloride under anhydrous conditions. The product is L-glutamine in the form of a hydrogen halide addition salt. The carboallyloxy group may be an unsubstituted or substituted group. Although unsubstituted carboallyloxy derivatives of L-glutamic acid esters or amides are preferred for use in this invention, alkyl or phenyl substituted carboallyloxy derivatives of L-glutamic acid esters or amides may be utilized, the alkyl or phenyl groups being attached to the allyl group.

The term "an allyl chloroformate" as used herein includes allyl chloroformate and phenyl- and alkyl-substituted allyl chloroformates in which the alkyl group is preferably a lower alkyl group, that is, an alkyl group containing less than about eight carbon atoms. Similarly, the terms "an N-carboallyloxy-L-glutamic acid" and "an N-carboallyloxy-L-glutamine" refer to compounds in which the allyloxy group may be an unsubstituted allyloxy group or a phenyl- or alkyl-substituted allyloxy group in which the alkyl group is a lower alkyl group as described above. The terms "allyl chloroformate," "N-carboallyloxy-L-glutamic acid" and "N-carboallyloxy-L-glutamine" refer to compounds in which the allyl group is unsubstituted.

In carrying out the process of this invention using L-glutamic acid as a starting material, the L-glutamic acid is esterified with an alcohol, preferably a lower aliphatic alcohol, that is, an alcohol having less than about eight carbon atoms, such as for example, methyl alcohol or ethyl alcohol, to produce the gamma-ester of L-glutamic acid. The ester is then reacted with a chloroformate of an allyl compound such as allyl chloroformate, phenallyl chloroformate, methallyl choroformate, or other alkallyl chloroformates. Reaction of the allyl chloroformate with the gamma-ester of L-glutamic acid produces the gamma-ester of N-carboallyloxy-L-glutamic acid. In the case where a substituted allyl chloroformate is utilized, the corresponding substituted N-carboallyloxy-L-glutamic acid will be produced. The N-carboallyloxy glutamic acid ester is then amidated with ammonia to produce the corresponding gamma-amide, for example, the gamma-amide of N-carboallyloxy-L-glutamic acid which may also be called N-carboallyloxy-L-glutamine. The gamma-amide of N-carboallyloxy-L-glutamic acid or alkyl or phenyl derivative thereof in which the alkyl or phenyl group is attached to the allyl group is treated with hydrogen bromide or hydrogen chloride under anhydrous conditions. The gamma-amide of the N-carboallyloxy glutamic acid may be utilized as such, but is preferably utilized in the form of its ammonium salt. The hydrogen halide treatment results in the removal of the carboallyloxy group from the glutamine nucleus and the L-glutamine produced thereby may be recovered from the reaction product mixture by any suitable means.

In one embodiment of the instant invention, a gamma-methyl ester of L-glutamic acid is reacted with allyl chloroformate in the presence of a magnesium oxide catalyst. When the reaction has proceeded to substantial completion, the reaction mixture is extracted with chloroform to remove unreacted allyl chloroformate. The aqueous residue is acidified with hydrochloric acid and re-extracted with chloroform. The resulting chloroform solution contains the gamma-ester of N-carboallyloxy-L-glutamic acid. The gamma-ester is then amidated with ammonia by conventional procedures to obtain the gamma-amide of N-carboallyloxy-L-glutamic acid. Amidation reagents such as aqueous or alcoholic ammonia may be employed. Amidation is preferably carried out at a temperature between about 50° C. and about 65° C. for between about 20 hours and about 24 hours. When a lower temperature is employed, the time for amidation to proceed to completion is extended. The product is the ammonium salt of the gamma-amide of N-carboallyloxy-L-glutamic acid which may also be referred to as the ammonium salt of N-carboallyloxy-L-glutamine. The reaction product is dried, dissolved in acetic acid, and treated with anhydrous hydrogen bromide or hydrogen chloride in the form of an acetic acid solution. The hydrogen halide treatment is preferably carried out at a temperature between about 15° C. and about 40° C. Room temperature is satisfactory. After from about 1 hour to about 3 hours the reaction mixture is evaporated to dryness under reduced pressure at about 50° C. to about 65° C. The residue comprises L-glutamine in the form of a hydrogen halide addition salt.

L-glutamine may be recovered from the residue by any convenient method. According to one procedure, the residue is dissolved in absolute methanol and the pH of the solution adjusted to about 5.5 with aqueous ammonia solution. A volume of acetone equivalent to that of the methanol is then added and after storage of the mixture at a temperature from about 0° C. to about 10° C. for about 2 hours, the crystalline product is filtered and washed with methanol. The crystalline glutamine obtained is about 85% pure and may be recrystallized to raise the purity if desired.

A particularly preferred procedure for producing a highly purified L-glutamine involves, dissolving crude L-glutamine in the minimum quantity of water which will readily dissolve the L-glutamine at a temperature of about 58° C. to about 70° C., and preferably between about 60° C. and about 65° C., and filtering the solution rapidly as soon as the L-glutamine is completely dissolved in the preheated water. The quantity of water will preferably be about 9 times the quantity of L-glutamine on a weight basis. To the filtrate is added a quantity of acetone equal to twice the volume of water utilized initially, the acetone having a temperature of about 50° C. The mixture is cooled as fast as possible to 0° C., and after about 1.5 hours at this temperature the L-glutamine crystals which have separated are recovered by filtration. The crystalline L-glutamine is washed with methanol or acetone and dried at about 55° C. to about 60° C. By means of this crystallization procedure, glutamine having a purity of about 85% may be raised to a purity of about 91% in one recrystallization step with a 91% yield. A second recrystallization in accordance with this preferred procedure raises the purity to about 96% with a 95% yield.

In carrying out the instant invention the gamma-ester of L-glutamic acid employed has the structural formula:

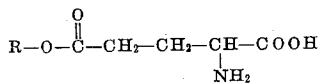

when R is an alkyl or a phenyl group. Gamma-alkyl esters of L-glutamic acid are preferred and particularly gamma-alkyl esters of L-glutamic acid in which the alkyl group is a lower alkyl group, that is, an alkyl group containing less than about 8 carbon atoms. Specific esters which are useful include gamma-methyl-, gamma-ethyl-, gamma-propyl-, gamma-isopropyl-, gamma-butyl ester, etc., of L-glutamic acid. The gamma-methyl ester of L-glutamic acid is particularly preferred because yields of L-glutamine obtained are higher than when other gamma-esters of L-glutamic acid are employed and less time is required in carrying out the process.

The gamma-ester of L-glutamic acid is reacted with the chloroformate of an allyl compound, such as allyl chloroformate, phenallyl chloroformate, methallyl chloroformate, ethallyl chloroformate, and higher substituted alkallyl chloroformate. In the case of alkyl substituted allyl chloroformates, those in which the alkyl group is a lower alkyl group, that is, an alkyl group containing less than about 8 carbon atoms, is preferred as producing the most desirable results in accordance with this invention. Unsubstituted allyl chloroformate is particularly preferred by reason of convenience in handling, commercial availability, and the high yields of L-glutamine produced utilizing this compound.

The reaction of the gamma-ester of L-glutamic acid and an allyl chloroformate is exothermic, and results in the gamma-ester of an N-carboallyloxy-L-glutamic acid having the following structure formula:

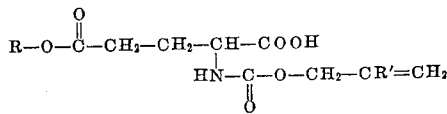

where R is an alkyl or phenyl group and R' is H, an alkyl or phenyl group. The reactants are generally admixed at a temperature between about 0° C. and about 55° C., preferably between about 5° C. and about 30° C. The temperature of the resulting mixture is allowed to rise to about atmospheric temperature, and in a preferred embodiment the mixture is agitated at about atmospheric temperature for between about ½ hour and about 2 hours. The resulting reaction products are extracted with a solvent to separate the unreacted allyl chloroformate. An organic solvent such as chloroform, carbon tetrachloride, methylene chloride, or ethylene dichloride is used. The aqueous residue is then acidified, for example with hydrochloric acid, to a pH between about 1.5 and about 2.5. The gamma-ester of N-carboallyloxy-L-glutamic acid is extracted from the acidified solution with a solvent such as chloroform, carbon tetrachloride, methylene chloride, ethylene dichloride, ether, ethylacetate, and the like. In a preferred embodiment the product is extracted with chloroform and the chloroform extract is dried, for example, with anhydrous calcium sulfate or sodium sulfate. It is not necessary to dry the solution, but yields are improved by doing so. The solvent, such as chloroform, is then separated from the gamma-ester of N-carboallyloxy-L-glutamic acid, for example, by evaporation under reduced pressure.

The gamma-ester of N-carboallyloxy-L-glutamic acid is then amidated with ammonia to produce the new gamma-amide derivative of N-carboallyloxy-L-glutamic acid having the structural formula:

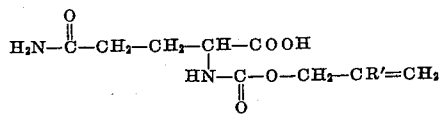

where R' is hydrogen, alkyl or a phenyl group. Concentrated ammonium hydroxide or absolute methanol saturated with ammonia may be employed for the amidation of the ester. In one embodiment, about a 28% ammonium hydroxide solution is employed at a temperature between about 50° C. and about 60° C. in a pressure vessel. When lower temperatures are employed the yields obtained are lower. In another embodiment, liquid ammonia is employed in a pressure vessel at about atmospheric temperature to amidate the gamma-ester. In still another embodiment, the amidation is carried out by saturating methanol with ammonia at about 0° C., admixing with the gamma-ester and heating to between about 45° C. and about 50° C. in a pressure vessel. Ammonia is removed from the gamma-amide, for example, by evaporation.

The gamma-amide of N-carboallyloxy-L-glutamic acid is then converted to L-glutamine by reaction with a hydrogen halide such as hydrogen bromide or hydrogen chloride under anhydrous conditions. Hydrogen bromide is preferred as producing the best reaction rates and the highest yields of L-glutamine. The gamma-amide of N-carboallyloxy-L-glutamic acid is conveniently dissolved in a solvent prior to the treatment. The hydrogen halide gas is also conveniently utilized in the form of a solution. Any suitable organic solvent capable of dissolving the gamma-amide of an N-carboallyloxy-L-glutamic acid and which is inert to the reaction may be utilized. Solvents such as formic acid, acetic acid, propionic acid, nitromethane, dioxane, and the like, are useful for this purpose. Acetic acid is particularly preferred. Preferably, the N-carboallyloxy-L-glutamic acid and hydrogen halide are dissolved in the same solvent for the treatment.

A preferred embodiment involves dissolving the gamma-amide of N-carboallyloxy-L-glutamic acid in acetic acid and treating the solution with an acetic acid solution of hydrogen bromide. The reaction proceeds at room temperature, but is accelerated by a slight warming of the reaction mixture. The reaction will usually be complete in from about 1 hour to about 3 hours. Desirably, the reaction mixture should be agitated during this period. L-glutamine may be recovered from the reaction product mixture by any convenient means, but is preferably recovered by means of the crystallization procedure outlined above.

The following examples described a specific embodiment of this invention. All parts are by weight unless otherwise indicated.

*Example*

L-glutamic acid in the amount of about 147 parts was suspended in about 1890 parts of absolute methanol. The mixture was cooled in an ice bath to about 12° C., and about 137 parts of sulfuric acid (95%) was added with stirring at such a rate as to keep the temperature of the mixture below about 25° C. The cooling was discontinued, but the reaction mixture was stirred at about 27° C. for about 5 hours. The mixture was again cooled to about 12° C. and neutralized to a pH of about 7 with a 1:1 mixture of diethylamine and methanol. The mixture was then kept at about 0° C. or below for at least 5 hours. Agitation was unnecessary. The reaction product, which was gamma-methyl-L-glutamate, was recovered by filtration.

Gamma-methyl-L-glutamate, prepared as above described, in the amount of about 161 parts was agitated in about 600 parts of water containing about 69.6 parts of magnesium hydroxide. To this mixture was added with agitation about 145 parts of allyl chloroformate over a period of about 20 to 30 minutes. The reaction mixture was cooled so that the temperature did not rise above about 35° C. After addition of the allylchloroformate, the reaction mixture was stirred for about 2 hours at about 27° C. and then stored for at least 15 hours, at about 3° C. The reaction mixture was filtered and the filtrate extracted with two 300 part portions of chloroform. The extracted filtrate was acidified to a pH of about 1.8 with a 1:1 mixture of water and concentrated hydrochloric acid. The acidified mixture was again extracted with three 300-part portions of chloroform. The chloroform extracts were combined and washed once with about 200 parts water. The chloroform was then evaporated under reduced pressure (about 25 mm. Hg) with a bath temperature not greater than about 65° C. The residue was gamma-methyl-N-carboallyloxy-L-glutamate.

This derivative of glutamic acid was a white solid and had a melting point of about 48° C. to 50° C. The specific rotation was minus 16.2 degrees at 28° C. when 4.08 grams were dissolved in 100 mls. of water. The refractive index of the compound at 26.5° C. was 1.473. The nitrogen content was determined as 5.83%, as compared to 5.71% theoretical or calculated nitrogen content.

Gamma-methyl-N-carboallyloxy-L-glutamate produced as above in the amount of about 158 parts was dissolved in about 170 parts of 28% aqueous ammonium hydroxide solution and maintained in an autoclave (under autogenous pressure) at about 53° C. for about 24 hours. The solution was evaporated under reduced pressure (about 30 mm. Hg) using a bath temperature not over about 65° C. The evaporation was continued until the reaction mixture ceased to bubble. The product was a viscous taffy-like material which became glass-like in character upon cooling. It was brittle and transparent. The product was a mixture of N-carboallyloxy-L-glutamine and its ammonium salt. The ammonium salt of N-carboallyoxy-L-glutamine had a specific rotation of —2.4 at 20° C. when 4.4 grams were dissolved in 100 mls. of water. The nitrogen content was determined as 16.8%; the theoretical nitrogen content is 17.0%. The ammonium salt of N-carboallyoxy-L-glutamine was converted to N-carboallyloxy-L-glutamine by acidification with a weak organic acid such as formic acid.

The ammonium salt of N-carboallyloxy-L-glutamine in the amount of about 24.7 parts was dissolved in about 105 parts glacial acetic acid by means of warming the mixture to a temperature of about 48° C. with agitation. To the warmed solution was added about 105 parts of a 36% solution of hydrogen bromide in glacial acetic acid. The mixture was allowed to stand at room temperature for about 2 hours with occasional agitation. The reaction mixture was then evaporated to dryness under reduced pressure (about 25 mm. Hg) using a bath temperature of about 58° C. The residue which was a sticky straw-colored mass was dissolved in about 158 parts absolute methanol and the pH of the solution was adjusted to about 5.5 with a 14% aqueous ammonia solution. A volume of acetone equivalent to that of the methanol was then added. After storage of the mixture at about 5° C. for about 2 hours, the crystalline product was filtered and washed with methanol. The yield of L-glutamine amounted to about 9.3 parts and had a purity of about 84%. The crude L-glutamine was dissolved in about 84 parts of water at a temperature of about 63° C. and was filtered rapidly as soon as the solution was complete. To the filtrate was added about 316 parts of hot acetone (50° C.). The mixture was cooled as fast as possible to 0° C., and after about 1.5 hours at this temperature it was filtered to give crystalline glutamine. The recrystallized L-glutamine had a purity of about 91% and the yield amounted to a 91% recovery. By recrystallizing the L-glutamine a second time, utilizing the same procedure, the purity was raised to 96% with a 95% yield.

This application is a continuation-in-part application of application Serial No. 334,371, filed January 30, 1953.

Having thus fully described and illustrated the character of the instant invention, what is desired to be protected by Letters Patent is:

1. A process for he production of L-glutamine which comprises treating the gamma-amide of an N-carboallyloxy-L-glutamic acid having the structural formula:

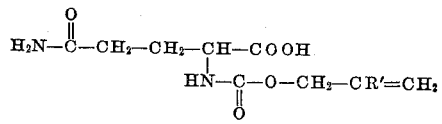

where R' is selected from the group consisting of hydrogen, alkyl and phenyl with a hydrogen halide under anhydrous conditions.

2. The process for the production of L-glutamine which comprises treating the gamma-amide of N-carbomethallyloxy-L-glutamic acid with hydrogen bromide under anhydrous conditions.

3. The process of claim 2 in which the reaction is carried out in acetic acid.

4. The process for the production of L-glutamine which comprises treating the gamma-amide of N-carboallyloxy-L-glutamic acid with a hydrogen halide under anhydrous conditions.

5. The process of claim 4 in which the hydrogen halide is hydrogen bromide.

6. The process for the production of L-glutamine which comprises amidating the gamma-ester of N-carboallyloxy-L-glutamic acid with ammonia, separating the gamma-amide of N-carboallyloxy-L-glutamic acid from the amidation reaction products and treating the amide with hydrogen bromide under anhydrous conditions.

7. The process of claim 6 in which the reaction is carried out in acetic acid.

8. A process for the production of L-glutamine which comprises reacting a gamma-ester of L-glutamic acid with allyl chloroformate in the presence of magnesium oxide catalyst at a temperature between about 0° C. and about atmospheric temperature, separating the gamma-ester of N-carboallyloxy-L-glutamic acid from the reaction products, amidating the gamma-ester with ammonia to produce the gamma-amide of N-carboallyloxy-L-glutamic acid, separating the gamma-amide from the amidation products, and treating the gamma-amide with anhydrous hydrogen bromide.

9. The process of claim 8 in which the treatment with hydrogen bromide is carried out in acetic acid.

References Cited in the file of this patent

UNITED STATES PATENTS 2,523,744    Warner et al. _____ Sept. 26, 1950

OTHER REFERENCES

Bergmann et al.: Chem. Abstracts, vol. 26, pp. 5072 (1932).

Bergmann et al.: Ber. Deut. Chem., vol. 66, pp. 1288–1290 (1933).

Green et al.: J. Biol. Chem., vol. 197, pp. 772, 777–778 (1952).